United States Patent
Yanagi

(10) Patent No.: US 12,103,357 B2
(45) Date of Patent: Oct. 1, 2024

(54) CONTROL DEVICE FOR COOLING SYSTEM

(71) Applicant: TOYOTA JIDOSHA KABUSHIKI KAISHA, Toyota (JP)

(72) Inventor: Takashi Yanagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 18/146,514

(22) Filed: Dec. 27, 2022

(65) Prior Publication Data
US 2023/0249516 A1    Aug. 10, 2023

(30) Foreign Application Priority Data

Feb. 9, 2022    (JP) .................... 2022-018619

(51) Int. Cl.
    *B60H 1/00*      (2006.01)

(52) U.S. Cl.
    CPC ....... *B60H 1/00807* (2013.01); *B60H 1/0073* (2019.05)

(58) Field of Classification Search
CPC ... B60L 58/26; B60K 11/02; B60K 2001/006; H02P 29/60; H05K 7/20927
See application file for complete search history.

(56) References Cited

U.S. PATENT DOCUMENTS 5,923,135 A * 7/1999 Takeda .................. B60L 50/51
    318/432
10,514,309 B2 * 12/2019 Kawaguchi ........ H05K 7/20945

2006/0236708 A1 * 10/2006 Mizuno ................ B60H 1/3219
    62/183
2012/0022775 A1 * 1/2012 Yamada .................. B60L 50/16
    701/123
2012/0082871 A1 * 4/2012 Simonini .............. H01M 10/66
    429/50
2014/0027089 A1 * 1/2014 Hisada .................. B60L 3/0061
    165/11.1
2016/0155278 A1 * 6/2016 Nozawa ................ B60K 6/445
    701/22

(Continued)

FOREIGN PATENT DOCUMENTS

| JP | 2009-284597 A | 12/2009 |
|----|---|---|
| JP | 2015-197029 A | 11/2015 |

(Continued)

*Primary Examiner* — Nelson J Nieves
(74) *Attorney, Agent, or Firm* — Oliff PLC

(57) ABSTRACT

A control device for a cooling system is provided. The cooling system includes a cooling path through which a heat medium flows in an order of a first unit and a second unit. The cooling system is configured to cool the first unit and the second unit. The control device includes a processor being configured to execute: a process of repeatedly detecting or estimating a temperature of the heat medium flowing out of the first unit at predetermined time intervals, a process of storing a plurality of pieces of temperature data of the temperature detected or estimated during an immediately preceding predetermined period as a data group including a predetermined number of pieces of data, and a process of estimating a temperature of the heat medium flowing into the second unit by finding a maximum value from the data group.

4 Claims, 12 Drawing Sheets

(56) References Cited

U.S. PATENT DOCUMENTS

| | | | | |
|---|---|---|---|---|
| 2016/0161347 A1* | 6/2016 | Morinaga | ............ | G01K 15/007 374/1 |
| 2017/0072803 A1* | 3/2017 | Murai | ..................... | B60L 58/16 |
| 2018/0361823 A1* | 12/2018 | Igarashi | ............. | B60H 1/00771 |
| 2019/0047364 A1* | 2/2019 | Tokozakura | ........ | H01M 10/625 |
| 2019/0176631 A1* | 6/2019 | Senba | ................ | H05K 7/20872 |
| 2019/0178728 A1* | 6/2019 | Kawaguchi | ............ | G01K 13/00 |
| 2019/0337373 A1* | 11/2019 | Hüttl | ....................... | H02P 29/60 |
| 2020/0182706 A1* | 6/2020 | Maruyama | ............... | G01K 3/08 |
| 2020/0216254 A1* | 7/2020 | Tanabe | ..................... | F25D 3/08 |
| 2021/0008972 A1 | 1/2021 | Hashimoto et al. | | |
| 2021/0053689 A1* | 2/2021 | Lynn | .................. | H01M 10/486 |
| 2021/0273270 A1* | 9/2021 | Fujikawa | ............. | H01M 10/625 |
| 2021/0376344 A1* | 12/2021 | Toida | ..................... | B60L 58/31 |
| 2022/0407388 A1* | 12/2022 | Miyamoto | .............. | H02P 29/64 |

FOREIGN PATENT DOCUMENTS

| | | |
|---|---|---|
| JP | 2019-031200 A | 2/2019 |
| JP | 2021-013287 A | 2/2021 |

* cited by examiner

| FLOW RATE [L/min] | DELAY PERIOD [s] |
|---|---|
| 10 | 6.0 |
| 9 | 6.7 |
| 8 | 7.5 |
| 7 | 8.6 |
| 6 | 10.0 |
| 5 | 12.0 |
| 4 | 15.0 |
| 3 | 20.0 |
| 2 | 30.0 |

FIG. 11

| FLOW RATE [L/min] | PREDETERMINED NUMBER OF PIECES OF DATA |
|---|---|
| 10 | 60 |
| 9 | 67 |
| 8 | 75 |
| 7 | 86 |
| 6 | 100 |
| 5 | 120 |
| 4 | 150 |
| 3 | 200 |
| 2 | 300 |

CONTROL DEVICE FOR COOLING SYSTEM

CROSS-REFERENCE TO RELATED APPLICATION

This application claims priority to Japanese Patent Application No. 2022-018619 filed on Feb. 9, 2022, incorporated herein by reference in its entirety.

BACKGROUND

1. Technical Field

The technology disclosed herein relates to a control device for a cooling system.

2. Description of Related Art

Japanese Unexamined Patent Application Publication No. 2019-031200 (JP 2019-031200 A) describes a control device for a cooling system including a cooling path through which a heat medium flows in an order of a first unit, a second unit, and a radiator. The control device executes a process of detecting a temperature of the heat medium flowing into the first unit by a temperature sensor, a process of calculating a heat radiation amount of the heat medium in the radiator, and a process of estimating a temperature of the heat medium flowing into the radiator based on the detected value from the temperature sensor, the calculated heat radiation amount, and the like.

SUMMARY

In the above cooling system, the heat medium flowing through the cooling path flows into the second unit after passing through the first unit. Therefore, when monitoring the temperature of the heat medium flowing into the second unit, the temperature of the heat medium flowing out of the first unit can be regarded as the temperature of the heat medium flowing into the second unit without providing a temperature sensor in the second unit. However, there is a delay period between the outflow of the heat medium from the first unit and the inflow of the heat medium to the second unit depending on a distance from the first unit to the second unit and a flow rate of the heat medium. Therefore, the temperature of the heat medium flowing out of the first unit cannot be regarded directly as the temperature of the heat medium flowing into the second unit. That is, even if the detected or estimated temperature of the heat medium flowing out of the first unit is relatively low, the heat medium having a high temperature actually flows into the second unit at that time.

The present disclosure provides a control device for a cooling system in which a heat medium flows in an order of a first unit and a second unit. The control device can monitor a temperature of the heat medium flowing into the second unit based on a temperature of the heat medium flowing out of the first unit.

One aspect of the present disclosure provides a control device for a cooling system, the cooling system including a cooling path through which a heat medium flows in an order of a first unit and a second unit and being configured to cool the first unit and the second unit. The control device is configured to execute: a process of repeatedly detecting or estimating a temperature of the heat medium flowing out of the first unit at predetermined time intervals; a process of storing a plurality of pieces of temperature data of the temperature detected or estimated during an immediately preceding predetermined period as a data group including a predetermined number of pieces of data; and a process of estimating a temperature of the heat medium flowing into the second unit by finding a maximum value from the data group.

In the above configuration, the temperature of the heat medium flowing out of the first unit is first repeatedly detected or estimated at the predetermined time intervals. Then, the pieces of temperature data detected or estimated during the immediately preceding predetermined period are stored as the data group. The temperature of the heat medium flowing into the second unit is estimated based on the maximum value found from the data group. That is, the maximum value of the temperature of the heat medium flowing out of the first unit during the immediately preceding predetermined period is found, and the temperature of the heat medium flowing into the second unit is estimated based on the maximum value. According to this configuration, the temperature of the heat medium flowing into the second unit can be estimated based on the temperature of the heat medium flowing out of the first unit in consideration of a delay period between the outflow of the heat medium from the first unit and the inflow of the heat medium to the second unit. Further, it is possible to avoid or reduce the occurrence of a case where the actual temperature of the heat medium flowing into the second unit exceeds the temperature estimated based on the temperature of the heat medium flowing out of the first unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 shows a temporal change in the temperature T2 of the heat medium flowing out of the first PCU 112 with respect to the temporal change in the torque target value TT of the first PCU 112 in graph B; FIG. 3 shows a temporal change in the temperature T3 of the heat medium flowing into the second PCU 114 with respect to the temporal change in the torque target value TT of the first PCU 112, and also shows a delay period DT in graph C;

FIG. 5 shows a change in the temperature T2 of the heat medium flowing out of the first PCU 112 with respect to the temporal change in the torque target value TT of the first PCU 112 in graph B; FIG. 5 shows a change in an estimated value T3' of the temperature T3 of the heat medium flowing into the second PCU 114 with respect to the temporal change in the torque target value TT of the first PCU 112, and also shows a predetermined period PT in graph C;

FIG. 8 shows a change in the temperature T2 of the heat medium flowing out of the first PCU 112 with respect to the temporal change in the torque target value TT of the first PCU 112 in graph B; FIG. 8 shows a change in the estimated value T3' of the temperature T3 of the heat medium flowing into the second PCU 114 with respect to the temporal change in the torque target value TT of the first PCU 112, and also shows the predetermined period PT in graph C;

FIG. 10 shows changes in the temperature T2 of the heat medium flowing out of the first PCU 112 with respect to the temporal change in the torque target value TT of the first PCU 112 in graph B, in which a graph F1 corresponds to a case where the flow rate of the heat medium is 2 L/min, and a graph F2 corresponds to a case where the flow rate of the heat medium is 4 L/min; FIG. 10 shows changes in the temperature T3 of the heat medium flowing into the second PCU 114 with respect to the temporal change in the torque target value TT of the first PCU 112 in graph C, in which a graph G1 corresponds to the case where the flow rate of the heat medium is 2 L/min, a graph G2 corresponds to the case where the flow rate of the heat medium is 4 L/min, and delay periods DT1 and DT2 correspond to the respective flow rates;

FIG. 11 is a diagram showing an example of a relationship between the flow rate of the heat medium and a predetermined number of pieces of data constituting a data group;

FIG. 12 shows changes in the temperature T2 of the heat medium flowing out of the first PCU 112 with respect to the temporal change in the torque target value TT of the first PCU 112 in graph B, in which a graph J1 corresponds to the case where the flow rate of the heat medium is 2 L/min, and a graph J2 corresponds to the case where the flow rate of the heat medium is 4 L/min; FIG. 12 shows changes in the estimated value T3' of the temperature T3 of the heat medium flowing into the second PCU 114 with respect to the temporal change in the torque target value TT of the first PCU 112 in graph C, in which a graph K1 corresponds to the case where the flow rate of the heat medium is 2 L/min, a graph K2 corresponds to the case where the flow rate of the heat medium is 4 L/min, and predetermined periods PT1 and PT2 correspond to the respective flow rates.

DETAILED DESCRIPTION OF EMBODIMENTS

In the above aspect, the control device may be configured to, when the number of pieces of temperature data in the data group reaches the predetermined number of pieces of data in the storing process, delete oldest temperature data from the data group and store latest temperature data. According to this configuration, the pieces of temperature data in the data group are updated sequentially, thereby reducing the memory capacity required for the control device.

In the above aspect, the control device may be configured to, in the storing process, find a maximum value every predetermined unit period for the temperatures repeatedly detected or estimated at the predetermined time intervals, and store the maximum value as the temperature data constituting the data group. According to this configuration, it is only necessary to store one piece of temperature data every unit period, and not necessary to store all the pieces of temperature data in the immediately preceding predetermined period. Thus, it is possible to reduce the memory capacity required for the control device.

In the above aspect, the control device may be configured to change the predetermined unit period depending on a flow rate of the heat medium. According to this configuration, the unit period is shortened when the flow rate of the heat medium is relatively high, thereby increasing the accuracy of estimation of the temperature of the heat medium flowing into the second unit. When the flow rate of the heat medium is relatively low, the unit period is increased to reduce the number of pieces of temperature data to be stored as the data group, thereby reducing the memory capacity required for the control device.

In the above aspect, the control device may be configured to change the predetermined number of pieces of data to be stored as the data group depending on the flow rate of the heat medium. According to this configuration, the delay period between the outflow from the first unit and the inflow to the second unit is shortened, for example, when the flow rate of the heat medium is relatively high, thereby reducing the predetermined number of pieces of data constituting the data group. Thus, it is possible to reduce the memory capacity required for the control device.

Figure 1:
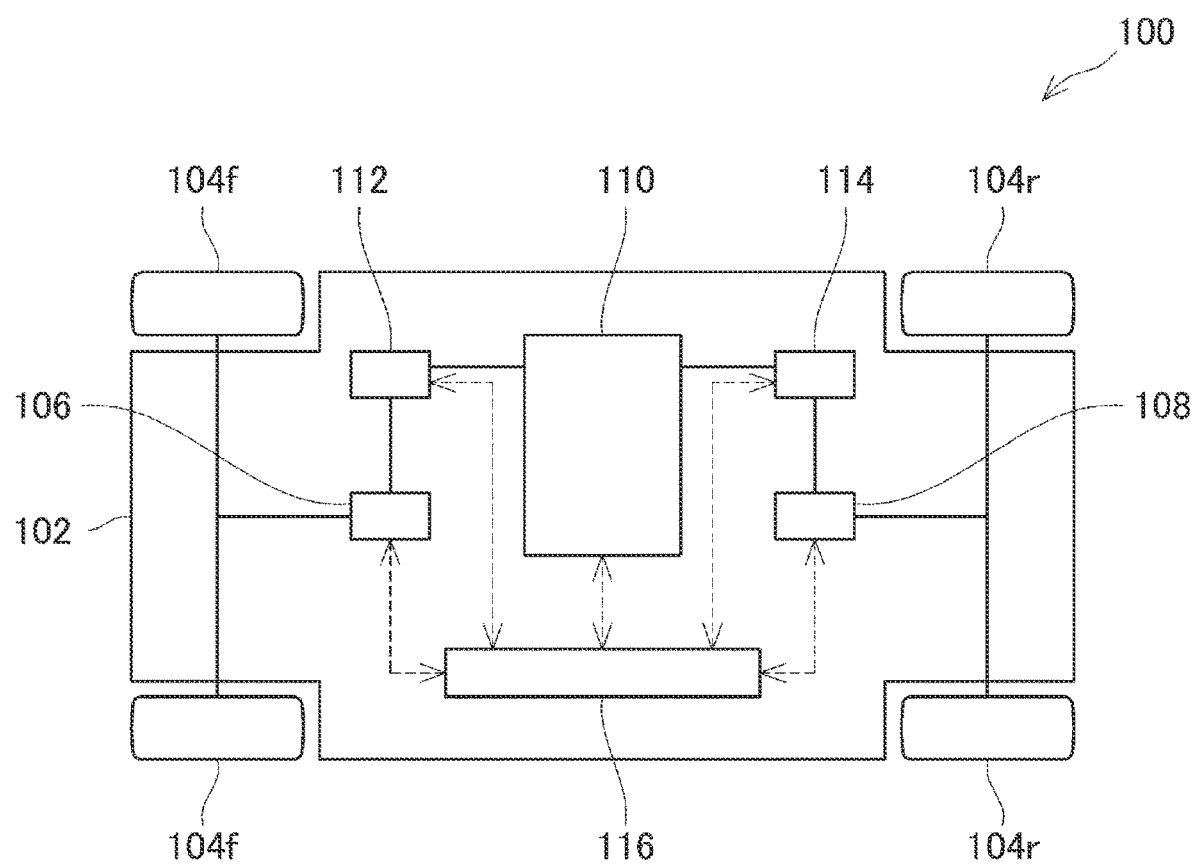
FIG. 1 is a diagram showing a main configuration of a vehicle 100 including a cooling system 10 according to embodiments.

A cooling system 10 according to embodiments and a vehicle 100 including the cooling system 10 will be described with reference to the drawings. The vehicle 100 is herein a so-called automobile that travels along a road. As shown in FIG. 1, the vehicle 100 includes a body 102 and a plurality of wheels 104f and 104r. The wheels 104f and 104r are rotatably attached to the body 102. The wheels 104f and 104r include a pair of front wheels 104f located at a front part of the body 102 and a pair of rear wheels 104r located at a rear part of the body 102. The front wheels 104f are disposed coaxially with each other, and the rear wheels 104r are also disposed coaxially with each other. The number of wheels 104f and 104r is not limited to four. Although there is no particular limitation, the body 102 is made of a metal such as steel or an aluminum alloy.

As shown in FIG. 1, the vehicle 100 further includes a front motor 106 and a rear motor 108. The front motor 106 is connected to the front wheels 104f, and can drive the front wheels 104f. The rear motor 108 is connected to the rear wheels 104r, and can drive the rear wheels 104r. That is, the vehicle 100 is capable of four-wheel drive. Although there is no particular limitation, each of the front motor 106 and the rear motor 108 of the embodiments is a three-phase motor generator having a U phase, a V phase, and a W phase.

As shown in FIG. 1, the vehicle 100 further includes a battery 110. The battery 110 includes a plurality of secondary battery cells, and is repeatedly rechargeable with external electric power. Although there is no particular limitation, the battery 110 is a lithium-ion battery, a nickel metal hydride battery, or the like.

As shown in FIG. 1, the vehicle 100 further includes two power conversion devices (power control units: hereinafter referred to as "PCUs") 112 and 114. The two PCUs 112 and 114 can control power supply to the corresponding motors 106 and 108. The two PCUs 112 and 114 include a first PCU 112 (a first unit) and a second PCU 114 (a second unit). The first PCU 112 is provided between the battery 110 and the front motor 106. The first PCU 112 can convert direct-current (DC) power from the battery 110 into alternating-current (AC) power, and supply the AC power to the front motor 106. The first PCU 112 can also convert AC power generated by the front motor 106 into DC power, and supply the DC power to the battery 110. That is, the vehicle 100 can charge the battery 110 by supplying regenerative power from the front motor 106 to the battery 110 during braking. For example, the first PCU 112 is an inverter. In this case, the first PCU 112 may further include a DC-DC converter.

The second PCU 114 is provided between the battery 110 and the rear motor 108. The second PCU 114 can convert DC power from the battery 110 into AC power, and supply the AC power to the rear motor 108. The second PCU 114 can also convert AC power generated by the rear motor 108 into DC power, and supply the DC power to the battery 110. That is, the vehicle 100 can charge the battery 110 by supplying regenerative power from the rear motor 108 to the battery 110 during braking. For example, the second PCU 114 is an inverter. In this case, the second PCU 114 may further include a DC-DC converter.

As shown in FIG. 1, the vehicle 100 further includes a control device 116. The control device 116 is a computer device including a processor, a memory, and the like. The control device 116 may be a single computer device or a combination of a plurality of computer devices. The control device 116 is connected to the front motor 106, the rear motor 108, the battery 110, the first PCU 112, and the second PCU 114 so that the control device 116 can communicate therewith, and can monitor and control operations thereof. For example, operation information indicating an operation performed by a user and vehicle information indicating a state of the vehicle 100 are input to the control device 116. The control device 116 controls the operation of each part of the vehicle 100 based on the received operation information and the received vehicle information. For example, the control device 116 can determine torque target values for the front motor 106 and the rear motor 108 based on the input operation information and the input vehicle information. The control device 116 can control the operations of the first PCU 112 and the second PCU 114 by feedback control so that actual torques output from the motors 106 and 108 are equal to the torque target values.

Figure 2:
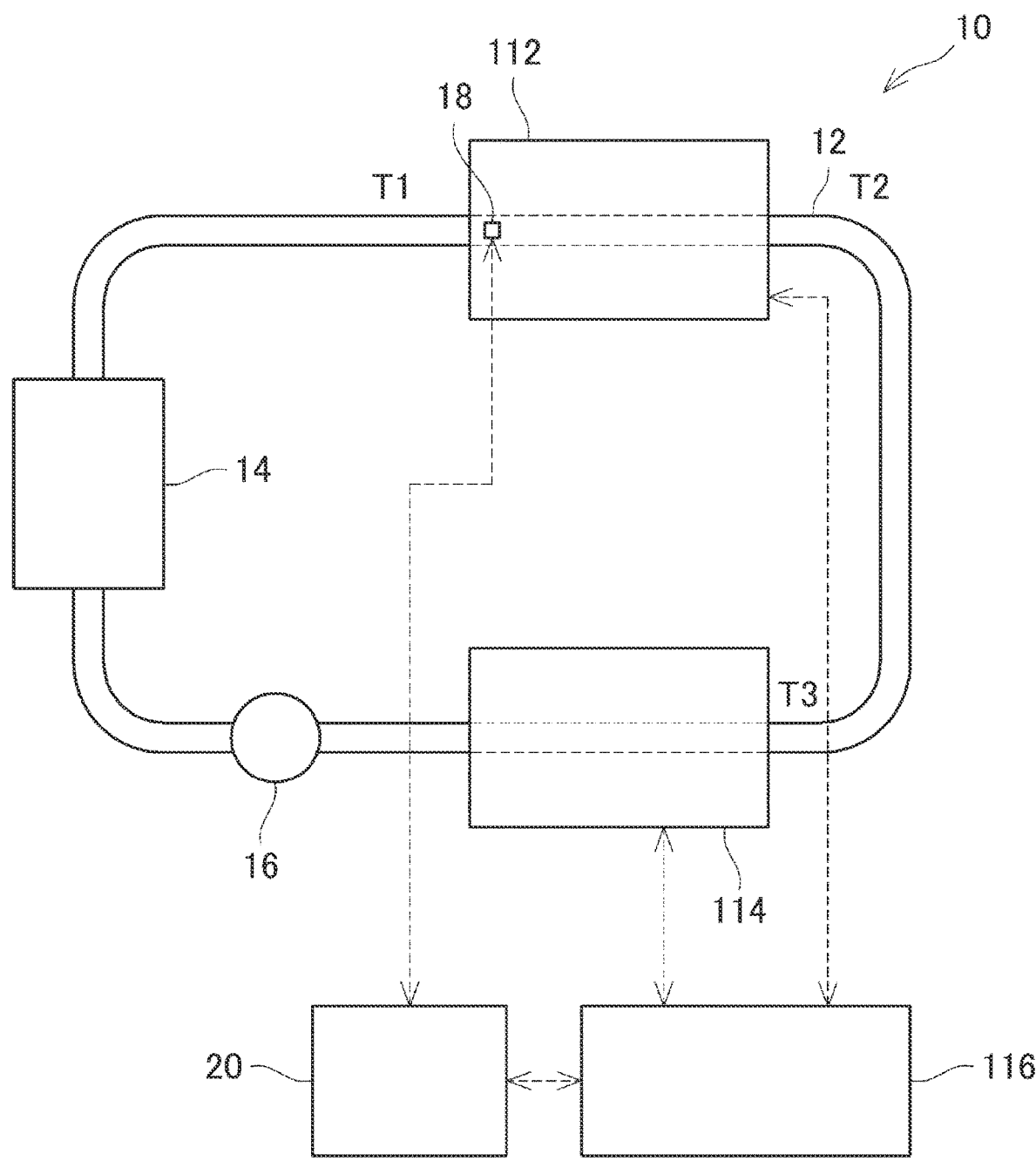
FIG. 2 is a diagram illustrating a configuration of the cooling system 10 according to the embodiments, and also showing a first power control unit (PCU) 112, a second PCU 114, and a control device 116 of the vehicle 100, in which T1 represents a temperature of a heat medium flowing into the first PCU 112, T2 represents a temperature of the heat medium flowing out of the first PCU 112, and T3 represents a temperature of the heat medium flowing into the second PCU 114.

Next, the cooling system 10 according to the embodiments will be described. The cooling system 10 according to the embodiments cools the first PCU 112 and the second PCU 114. As shown in FIG. 2, the cooling system 10 includes a cooling path 12, a radiator 14, and a pump 16. The cooling path 12 is a path through which a heat medium flows. The heat medium may be, for example, a coolant. The radiator 14 can exchange heat between the heat medium and outside air and dissipate heat from the heat medium. The pump 16 is provided in the cooling path 12, and can adjust the flow rate of the heat medium flowing through the cooling path 12. The cooling path 12 is connected to the radiator 14, the first PCU 112, and the second PCU 114. The heat medium flows in an order of the first PCU 112 and the second PCU 114 to collect heat from the first PCU 112 and the second PCU 114. Therefore, the temperature of the heat medium increases as the heat medium passes through the first PCU 112 and the second PCU 114. The temperature of the heat medium decreases when the radiator 14 dissipates heat from the heat medium.

As shown in FIG. 2, the cooling system 10 further includes a temperature sensor 18. The temperature sensor 18 detects a temperature T1 of the heat medium flowing into the first PCU 112. For example, the temperature sensor 18 is provided in the first PCU 112. In another embodiment, the temperature sensor 18 may be provided at a part where the temperature is substantially equal to the temperature T1 of the heat medium flowing into the first PCU 112. For example, in a case where the temperature of the heat medium is assumed to be unchanged between a timing immediately after the passage through the radiator 14 to a timing of the inflow to the first PCU 112 as in the embodiments, the temperature sensor 18 may be provided at any part between the radiator 14 and the first PCU 112.

As shown in FIG. 2, the cooling system 10 further includes a cooling control device 20. The cooling control device 20 is a computer device including a processor, a memory, and the like, and controls and monitors the operation of the cooling system 10. The cooling control device 20 may be a single computer device or a combination of a plurality of computer devices. The cooling control device 20 is connected to the temperature sensor 18 so that the cooling control device 20 can communicate with the temperature sensor 18, and can acquire a temperature detected by the temperature sensor 18. As described above, the temperature detected by the temperature sensor 18 is the temperature T1 of the heat medium flowing into the first PCU 112. The cooling control device 20 can adjust the flow rate of the heat medium by, for example, controlling the operation of the pump 16 based on the temperature detected by the temperature sensor 18. Alternatively, the cooling control device 20 transmits a predetermined abnormality signal to the control device 116 when the temperature detected by the temperature sensor 18 falls out of a permissible range. When the abnormality signal is received from the cooling control device 20, the control device 116 can avoid overheat of the first PCU 112 by, for example, limiting the operation of the first PCU 112.

The cooling control device 20 can estimate a temperature T2 of the heat medium flowing out of the first PCU 112 by adding a temperature increase amount of the heat medium in the first PCU 112 to the temperature detected by the temperature sensor 18. The heat medium flowing out of the first PCU 112 then flows into the second PCU 114. By estimating the temperature T2 of the heat medium flowing out of the first PCU 112, a temperature T3 of the heat medium flowing into the second PCU 114 can be monitored without providing a temperature sensor in the second PCU 114. Thus, the cooling control device 20 can, as in the case of the first PCU 112, control the operation of the pump 16 or limit the operation of the second PCU 114 through the control device 116 based on the temperature T3 of the heat medium flowing into the second PCU 114. The temperature increase amount of the heat medium in the first PCU 112 can be calculated as appropriate based on an index related to the heat generation of the first PCU 112, such as a torque target value TT of the first PCU 112, and an index related to the cooling of the first PCU 112, such as the temperature and the flow rate of the heat medium. In another embodiment, the cooling system 10 may further include a temperature sensor that directly measures the temperature of the heat medium flowing out of the first PCU 112 instead of estimating the temperature.

Figure 3:
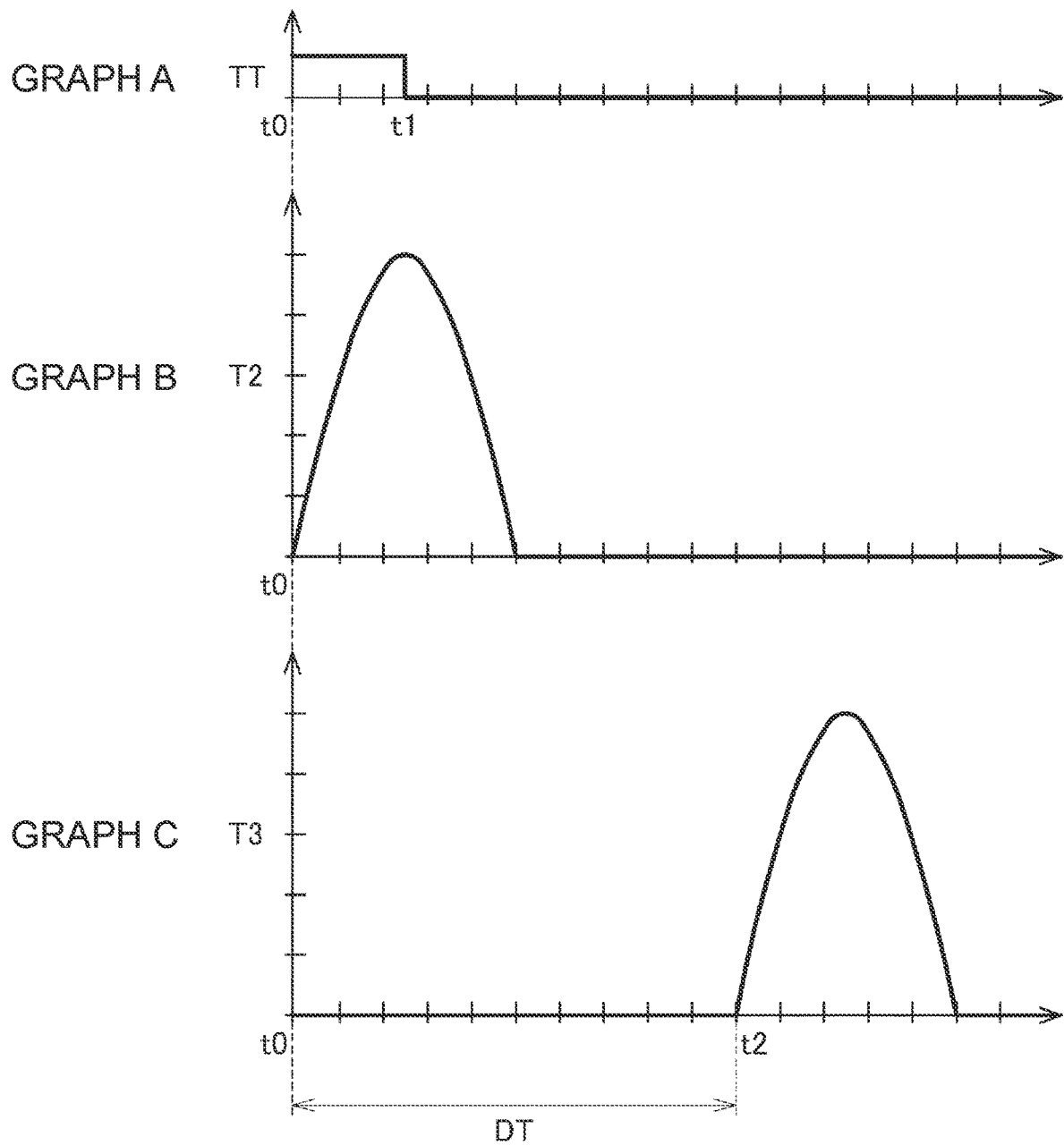
FIG. 3 shows a temporal change in a torque target value TT of the first PCU 112 in graph A.

However, there is a delay period DT between the outflow of the heat medium from the first PCU 112 and the inflow of the heat medium to the second PCU 114 depending on a distance from the first PCU 112 to the second PCU 114 and the flow rate of the heat medium. For example, it is assumed, as shown in graph A of FIG. 3, that the torque target value TT of the first PCU 112 is set to the maximum value from a time t0 to a time t1. In this case, the first PCU 112 generates a relatively large amount of heat from the time t0 to the time t1. As a result, as shown in graph B of FIG. 3, the temperature T2 of the heat medium flowing out of the first PCU 112 temporarily increases from a timing corresponding to the time t0. As shown in graph C of FIG. 3, the temperature T3 of the heat medium flowing into the second PCU 114 temporarily increases from a timing corresponding to a time t2 with a delay for the delay period DT. Therefore, the temperature T2 of the heat medium flowing out of the first PCU 112 cannot be regarded directly as the temperature T3 of the heat medium flowing into the second PCU 114.

Figure 4:
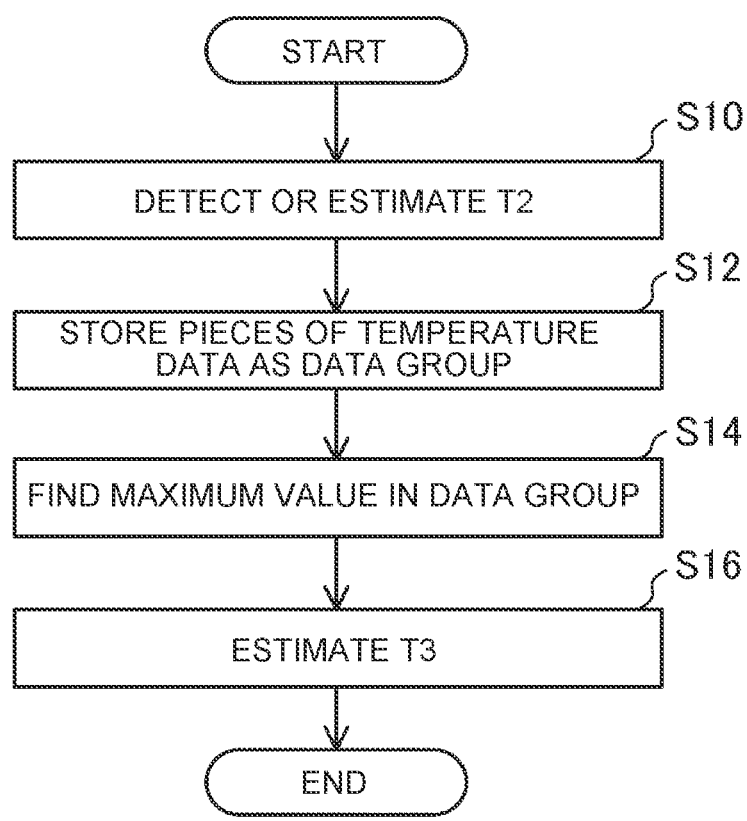
FIG. 4 is a flowchart showing an example of a temperature estimation process to be executed by a cooling control device 20 according to a first embodiment.

In view of the above, the cooling control device 20 executes a temperature estimation process shown in FIG. 4 to estimate the temperature T3 of the heat medium flowing into the second PCU 114 based on the temperature T2 of the heat medium flowing out of the first PCU 112. The temperature estimation process to be executed by the cooling control device 20 will be described below with reference to a flowchart shown in FIG. 4.

In Step S10, the cooling control device 20 repeatedly estimates the temperature T2 of the heat medium flowing out of the first PCU 112 at predetermined time intervals. As described above, the cooling control device 20 can estimate the temperature T2 of the heat medium flowing out of the first PCU 112 based on the temperature detected by the temperature sensor 18. In another embodiment, the temperature T2 of the heat medium flowing out of the first PCU 112 may be measured directly instead of being estimated. The predetermined time interval is, for example, 0.1 seconds. The predetermined time interval can be changed as appropriate depending on a cooling target or the like.

Figure 5:
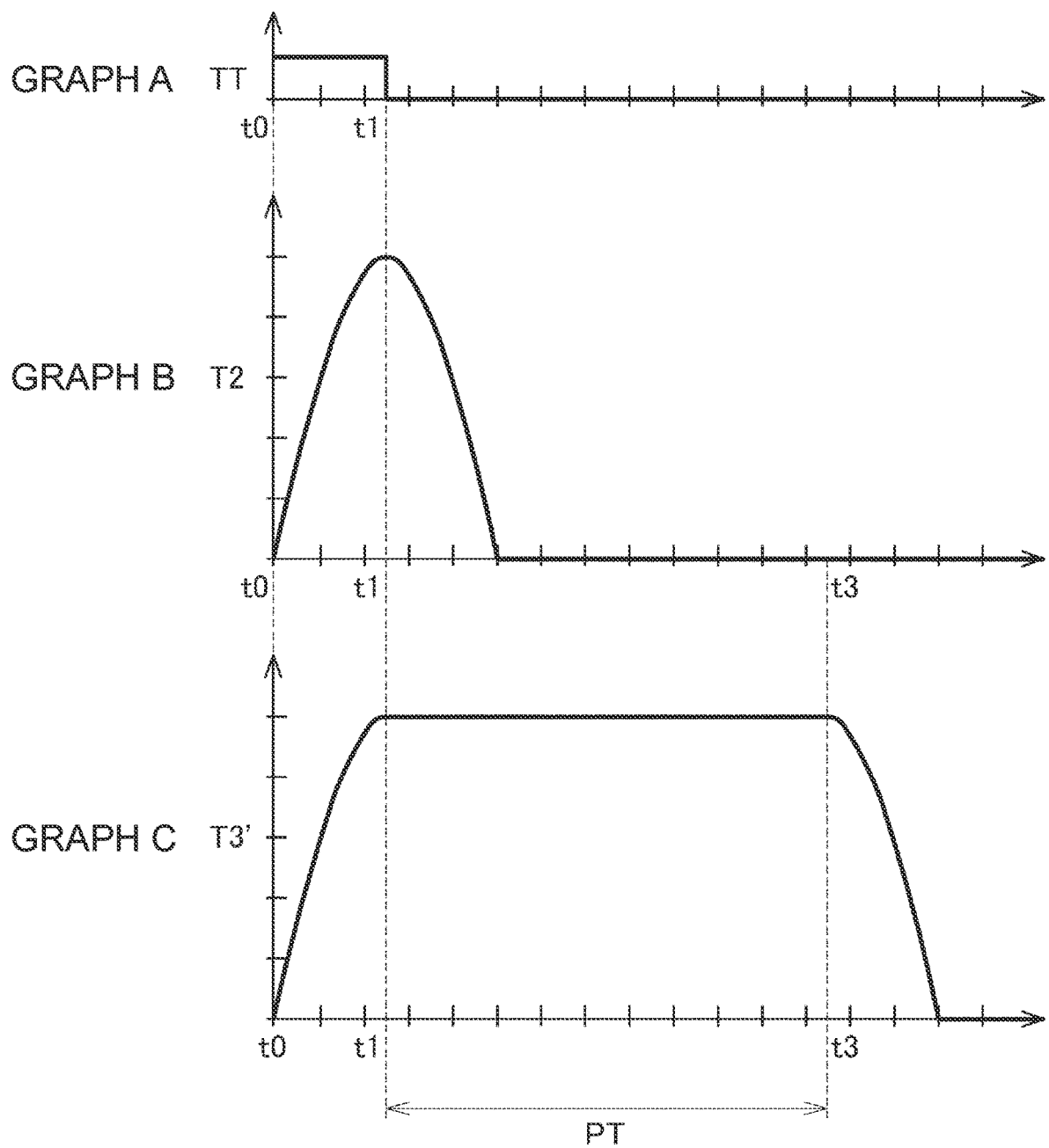
FIG. 5 shows a temporal change in the torque target value TT of the first PCU 112 in graph A.
Figures 6, 7:
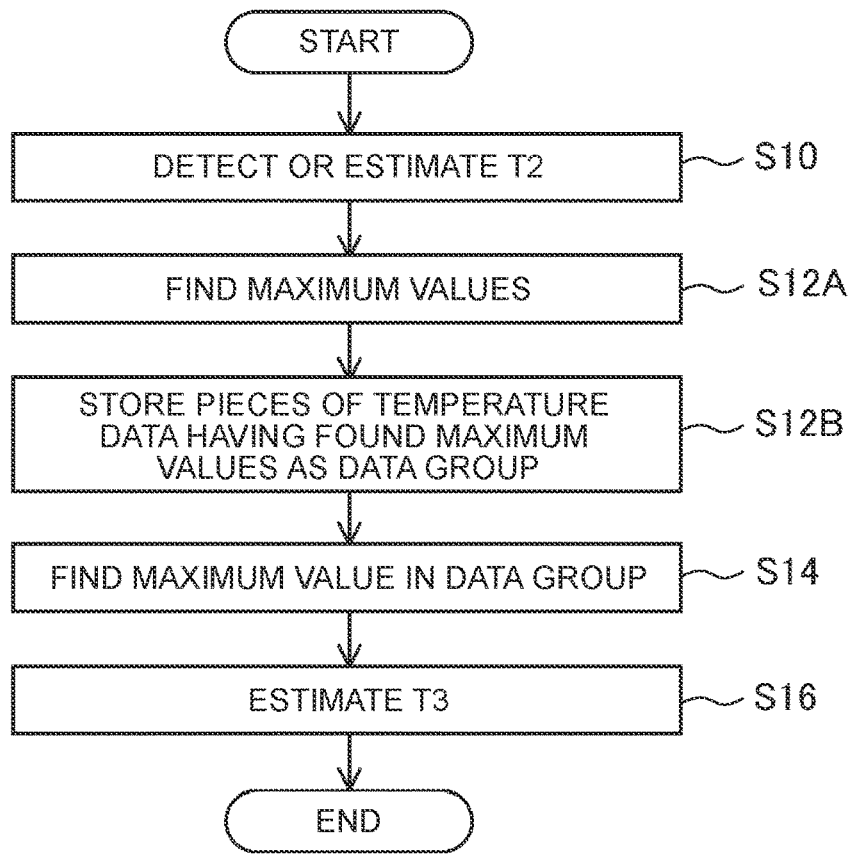
FIG. 6 is a diagram showing an example of a relationship between a flow rate of the heat medium and the delay period DT.
FIG. 7 is a flowchart showing an example of a temperature estimation process to be executed by the cooling control device 20 according to a second embodiment.

In parallel with Step S10, the cooling control device 20 repeats a process from Step S12 onward. In Step S12, the cooling control device 20 stores a plurality of pieces of temperature data estimated during an immediately preceding predetermined period PT (see FIG. 5) as a data group including a predetermined number of pieces of data. The predetermined period PT is set based on the delay period DT. The delay period DT between the outflow from the first PCU 112 and the inflow to the second PCU 114 changes depending on the flow rate of the heat medium, and reaches the maximum value when the flow rate of the heat medium is set to a lower limit value. For example, in the cooling system 10 of the present embodiment, as shown in FIG. 6, the flow rate of the heat medium is adjustable in a range from 2 L/min to 10 L/min. When the flow rate of the heat medium is set to 2 L/min, the delay period DT is 30 seconds. Therefore, in the present embodiment, the predetermined period PT during which the pieces of temperature data are stored is set to seconds corresponding to the maximum value of the delay period DT. In another embodiment, the predetermined period PT is not limited to the maximum value of the delay period DT, but may be set to a value larger than the maximum value.

The predetermined number of pieces of data to be stored by the cooling control device 20 is determined based on the predetermined time interval and the predetermined period PT. For example, if the predetermined period PT is 30 seconds, up to 300 pieces of data are stored as the temperature data of the heat medium estimated every 0.1 seconds in Step S10. That is, a data group including 300 pieces of temperature data is formed in the cooling control device 20. When the number of pieces of temperature data in the data group reaches the predetermined number of pieces of data (300 in this case), the oldest temperature data is deleted from the data group and the latest temperature data is newly stored. At any arbitrary time, only the pieces of temperature data during a period corresponding to the predetermined period PT (30 seconds in this case) back from that arbitrary time are stored in the cooling control device 20. According to this configuration, the pieces of temperature data in the data group are updated sequentially, thereby reducing the memory capacity required for the cooling control device 20.

In Step S14, the cooling control device 20 finds the temperature data having the maximum value from the data group stored in Step S12. The value of the found temperature data is the maximum value among those of the pieces of temperature data estimated in Step S10 during the immediately preceding predetermined period PT, and is the maximum value of the temperature T2 of the heat medium flowing out of the first PCU 112. As described above, the predetermined period PT is based on the maximum value of the delay period DT between the outflow of the heat medium from the first PCU 112 and the inflow of the heat medium to the second PCU 114. Therefore, the heat medium flowing out of the first PCU 112 may flow into the second PCU 114 with a delay for the predetermined period PT at the maximum. Therefore, the maximum value of the temperature data found in Step S14 can be regarded, at that time, as a possible maximum value of the temperature T3 of the heat medium flowing into the second PCU 114.

In Step S16, the cooling control device 20 estimates the temperature T3 of the heat medium flowing into the second PCU 114 based on the maximum value found in Step S14. In the present embodiment, the maximum value found in Step S14 is regarded as an estimated value T3' of the temperature T3 of the heat medium flowing into the second PCU 114. In another embodiment, the cooling control device 20 may determine the estimated value T3' of the temperature T3 of the heat medium flowing into the second PCU 114 based on the maximum value found in Step S14 by using a predetermined relational expression or the like.

Through the above process, the cooling control device 20 can estimate the temperature T3 of the heat medium flowing into the second PCU 114 based on the temperature T2 of the heat medium flowing out of the first PCU 112 in consideration of the delay period DT between the outflow of the heat medium from the first PCU 112 and the inflow of the heat medium to the second PCU 114. For example, it is assumed, as shown in graph A of FIG. 5, that the torque target value TT of the first PCU 112 is set to the maximum value from a time t0 to a time t1. In this case, as shown in graph B of FIG. 5, the temperature T2 of the heat medium flowing out of the first PCU 112 temporarily increases from a timing corresponding to the time t0, and takes the maximum value at the time t1. The cooling control device 20 finds the maximum value of the temperature T2 of the heat medium flowing out of the first PCU 112 within the immediately preceding predetermined period PT. Then, the temperature T3 of the heat medium flowing into the second PCU 114 is estimated based on the maximum value. As shown in graph C of FIG. 5, the estimated value T3' of the temperature T3 increases from the time t0 to the time t1, and is kept at the maximum value of the temperature T2 at the time t1 (or a value based on the maximum value) until a time t3 delayed by the predetermined period PT from the time t1. As a result, it is possible to avoid the occurrence of a case where the temperature T3 of the heat medium actually flowing into the second PCU 114 exceeds the estimated value T3' obtained by the cooling control device 20.

In the cooling control device 20 of the present embodiment, when the number of pieces of temperature data in the data group reaches the predetermined number of pieces of data, the oldest temperature data is deleted from the data group and the latest temperature data is stored in the process of Step S14. According to this configuration, the pieces of temperature data in the data group are updated sequentially, thereby reducing the memory capacity required for the cooling control device 20.

Second Embodiment

Figure 8:
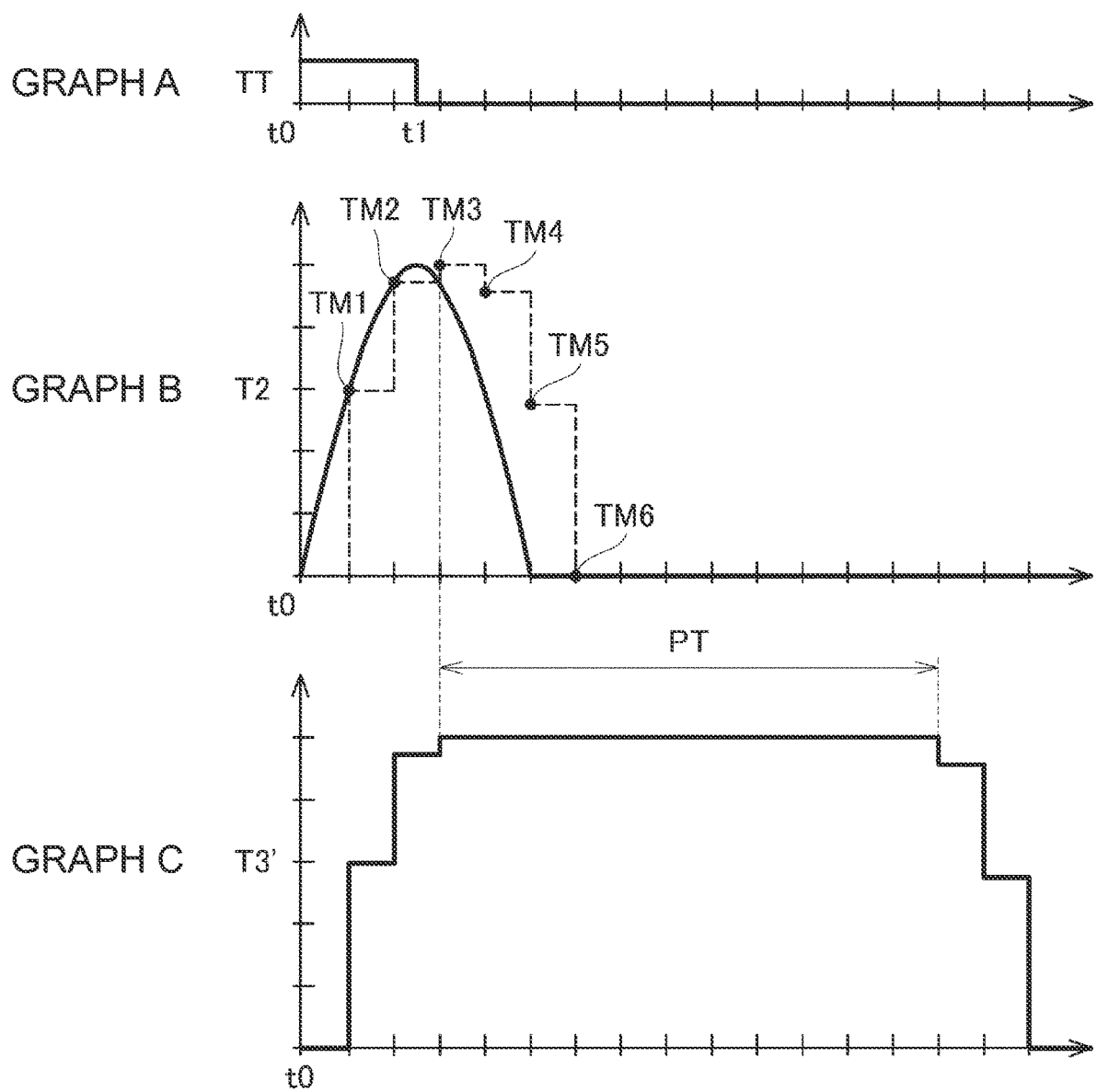
FIG. 8 shows the torque target value TT of the first PCU 112 in graph A.
Figure 9:
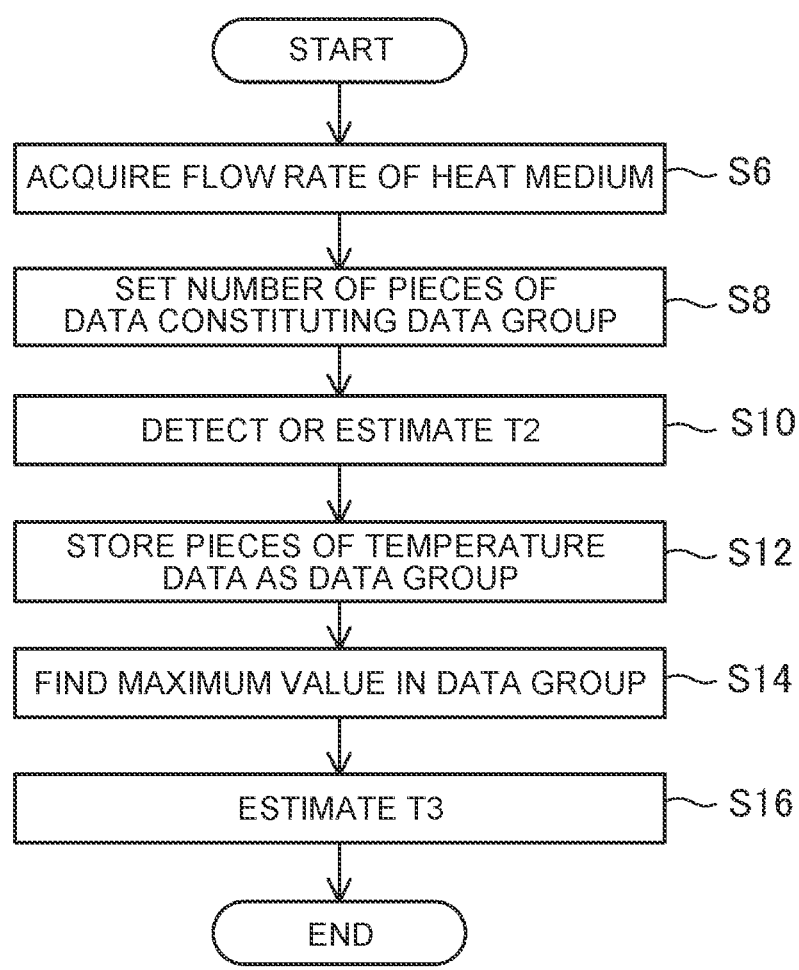
FIG. 9 is a flowchart showing an example of a temperature estimation process to be executed by the cooling control device 20 according to a third embodiment.
Figure 10:
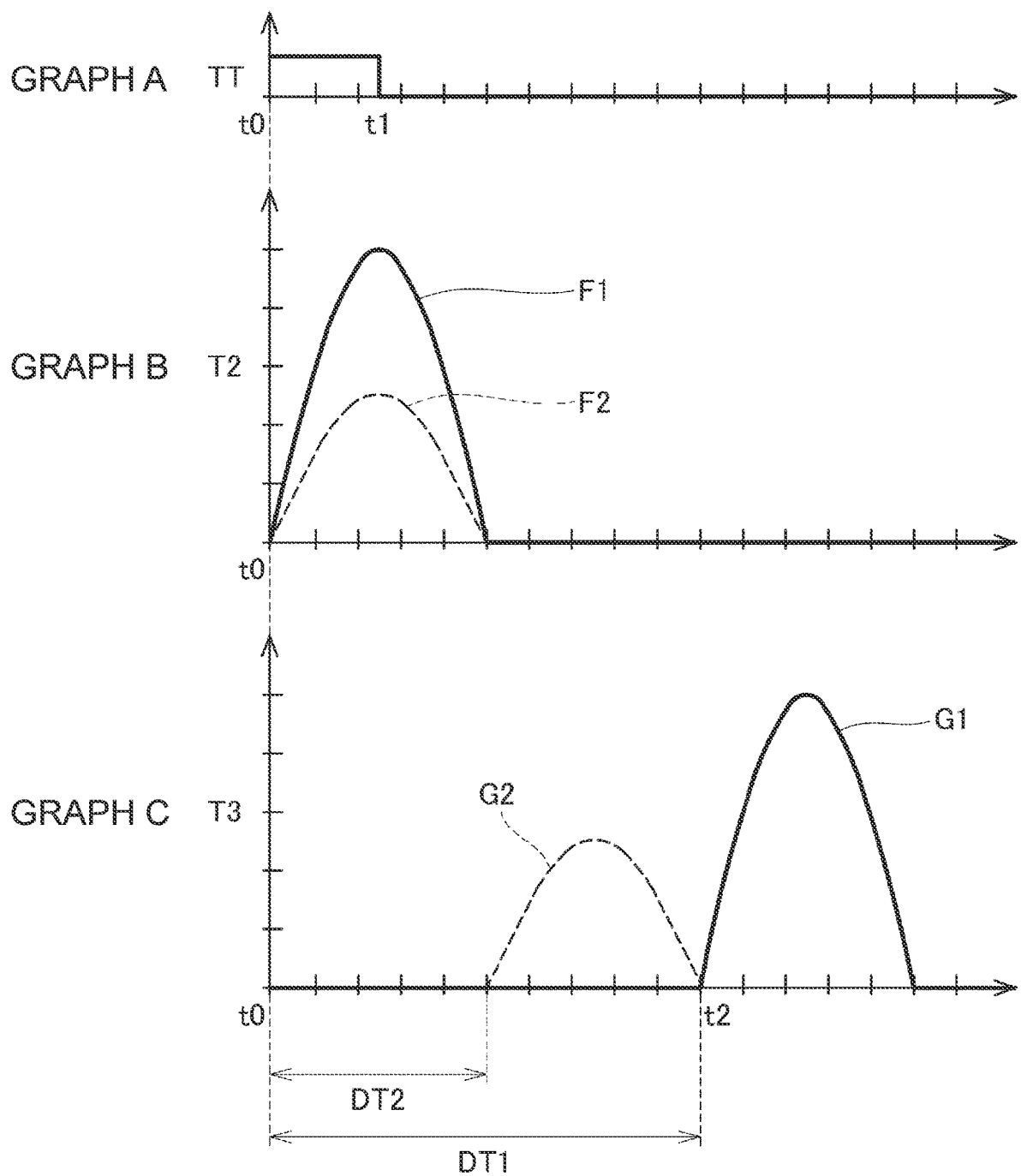
FIG. 10 shows a temporal change in the torque target value TT of the first PCU 112 in graph A.
Figure 12:
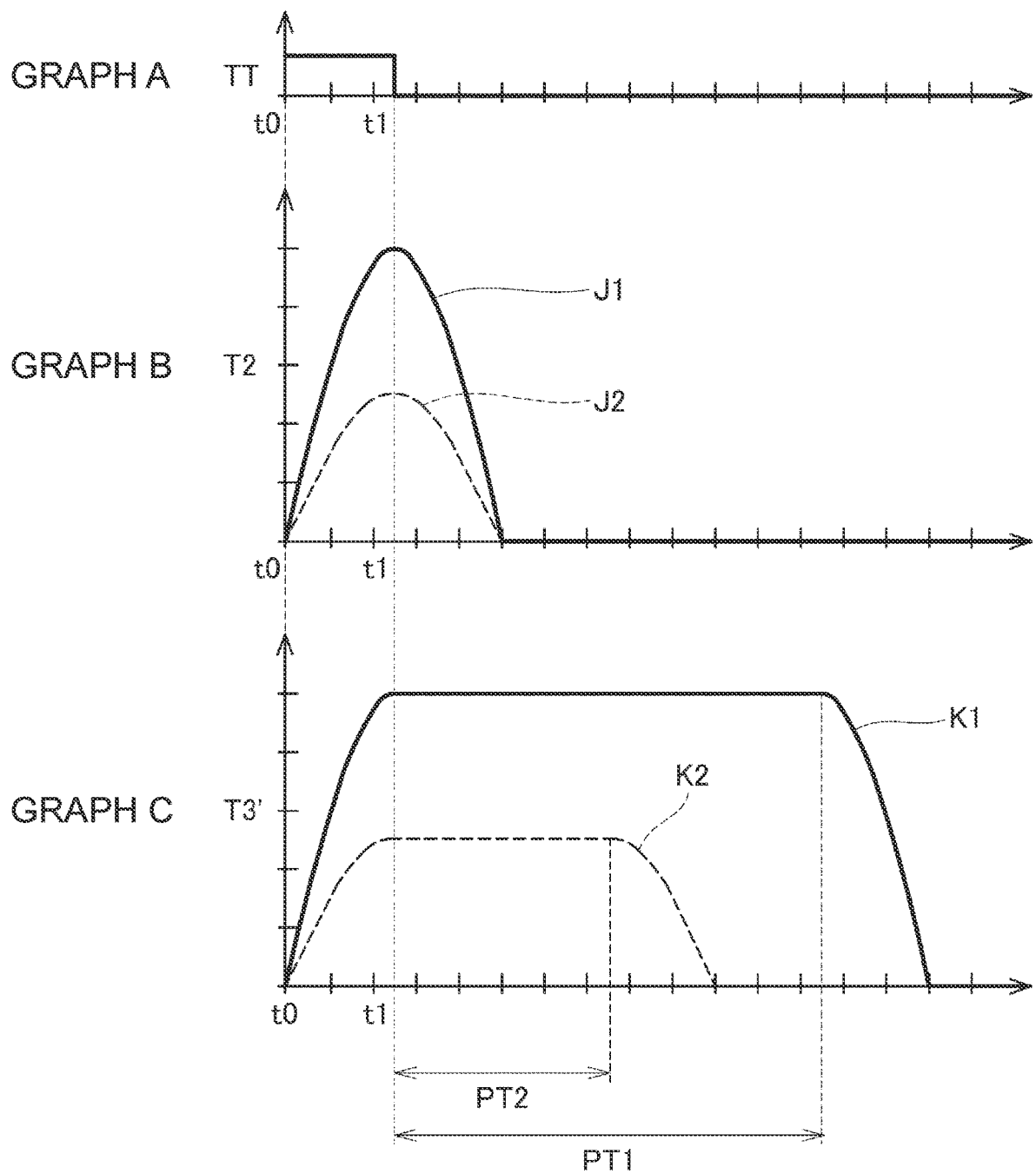
FIG. 12 shows a temporal change in the torque target value TT of the first PCU 112 in graph A.

A cooling system according to a second embodiment will be described with reference to FIGS. 7 and 8. The cooling system of the present embodiment differs from the cooling system 10 of the first embodiment in terms of the temperature estimation process to be executed by the cooling control device 20. Specifically, the cooling control device 20 of the present embodiment executes a temperature estimation process shown in FIG. 7. In this temperature estimation process, the process of Step S12 of the temperature estimation process of the first embodiment shown in FIG. 4 is changed to Steps S12A and S12B. In the description of the present embodiment, repetitive description will be omitted by denoting components in common with those in the first embodiment by the same signs.

In the temperature estimation process shown in FIG. 7, the cooling control device 20 repeats a process from Step S12A onward in parallel with the process of Step S10. In Step S12A, the cooling control device 20 finds the maximum value every predetermined unit period for the temperatures repeatedly estimated at the predetermined time intervals. The predetermined unit period is, for example, 3 seconds. That is, the maximum value is found every 3 seconds in Step S12A for the temperatures T2 of the heat medium repeatedly estimated (or detected) every 0.1 seconds in Step S10. The predetermined unit period for the finding of the maximum value is not limited to a specific period, but may be set shorter than the minimum value of the delay period DT. In the present embodiment, the minimum value of the delay period DT is 6 seconds as shown in FIG. 6. Therefore, the predetermined unit period is set to 3 seconds sufficiently shorter than the 6 seconds in consideration of a period required for the serial temperature estimation process.

In Step S12B, the cooling control device 20 stores a plurality of maximum values found in Step S12A during the immediately preceding predetermined period PT as the data group including the predetermined number of pieces of data. As in the first embodiment, the predetermined period PT is set in accordance with the maximum value of the delay period DT between the outflow of the heat medium from the first PCU 112 and the inflow of the heat medium to the second PCU 114. For example, if the predetermined period PT is 30 seconds and the predetermined unit period is 3 seconds, the cooling control device 20 stores up to 10 pieces of temperature data having the maximum values found in Step S12A. In this regard, the cooling control device 20 of the present embodiment can reduce the memory capacity required to store the data group.

The process from Step S14 onward in the second embodiment is the same as the process from Step S14 onward in the first embodiment. As described above, the cooling control device 20 of the present embodiment stores the maximum value found every predetermined unit period. Therefore, the maximum value found in Step S14 of the present embodiment changes stepwise compared to the maximum value found in Step S14 of the first embodiment.

Through the above process, the cooling control device 20 of the present embodiment can also estimate the temperature T3 of the heat medium flowing into the second PCU 114 based on the temperature T2 of the heat medium flowing out of the first PCU 112 in consideration of the delay period DT between the outflow of the heat medium from the first PCU 112 and the inflow of the heat medium to the second PCU 114. For example, it is assumed, as shown in graph A of FIG. 8, that the torque target value TT of the first PCU 112 is set to the maximum value from a time t0 to a time t1. In this case, as shown in graph B of FIG. 8, the temperature T2 of the heat medium flowing out of the first PCU 112 temporarily increases from a timing corresponding to the time t0, and takes the maximum value at the time t1. The cooling control device 20 finds the maximum values (TM1, TM2, . . . ) of the temperature T2 of the heat medium flowing out of the first PCU 112 every predetermined unit period (for example, 3 seconds). Then, the maximum value within the immediately preceding predetermined period PT is found among the maximum values (TM1, TM2, . . . ) found every predetermined unit period. Then, the temperature T3 of the heat medium flowing into the second PCU 114 is estimated based on the maximum value. As shown in graph C of FIG. 8, the estimated value T3' of the temperature T3 increases stepwise from the time t0 to the time t1. During a period until a time delayed by the predetermined period PT from the time of the maximum value (TM3) among the maximum values (TM1, TM2, . . . ) found every predetermined unit period, the estimated value T3' is kept at the maximum value of the temperature T2 (or a value based on the maximum value) at the time of that maximum value (TM3). As a result, it is possible to avoid or reduce the occurrence of the case where the temperature T3 of the heat medium actually flowing into the second PCU 114 exceeds the estimated value T3' obtained by the cooling control device 20.

The cooling control device 20 of the second embodiment finds the maximum value every predetermined unit period for the temperatures repeatedly detected or estimated at the predetermined time intervals in Step S10 (Step S12A), and stores the maximum value as the temperature data constituting the data group (Step S12B). According to this configuration, it is only necessary to store one piece of temperature data every unit period in the immediately preceding predetermined period PT, and not necessary to store all the pieces of temperature data in the immediately preceding predetermined period PT. Thus, it is possible to reduce the memory capacity required for the cooling control device 20.

In the above embodiment, the cooling control device 20 may change the predetermined unit period for the finding of the maximum value depending on the flow rate of the heat medium. According to this configuration, the unit period is shortened when the flow rate of the heat medium is relatively high, thereby increasing the accuracy of estimation of the temperature T3 of the heat medium flowing into the second PCU 114. When the flow rate of the heat medium is relatively low, the unit period is increased to reduce the number of pieces of temperature data to be stored as the data group, thereby reducing the memory capacity required for the cooling control device 20.

Third Embodiment

A cooling system according to a third embodiment will be described with reference to FIGS. 9 to 12. The cooling system of the present embodiment differs from the cooling systems of the first and second embodiments in terms of the temperature estimation process to be executed by the cooling control device 20. Specifically, the cooling control device 20 of the present embodiment executes a temperature estimation process shown in FIG. 9. In this temperature estimation process, a process of Steps S6 and S8 is added before the process of Step S10 of the temperature estimation process of the first embodiment shown in FIG. 4. In the description of the present embodiment, repetitive description will be omitted by denoting components in common with those in the first embodiment by the same signs.

In Step S6, the cooling control device 20 acquires the flow rate of the heat medium. As described above, in the present embodiment, the pump 16 adjusts the flow rate of the heat medium in response to an operation command transmitted from the cooling control device 20. Therefore, the cooling control device 20 can determine the flow rate of the heat medium based on the value of the operation command set for the pump 16 by the cooling control device 20. In another embodiment, the cooling control device 20 may acquire an actual flow rate of the heat medium by using a sensor or the like.

In Step S8, the cooling control device 20 sets the predetermined number of pieces of data to be stored as the data group based on the flow rate of the heat medium acquired in Step S6. As described above, the delay period DT between the outflow from the first PCU 112 and the inflow to the second PCU 114 changes along with the change in the flow rate of the heat medium (see FIG. 6). For example, it is assumed, as shown in graph A of FIG. 10, that the torque target value TT of the first PCU 112 is set to the maximum value from a time t0 to a time t1. In this case, as shown in graph B of FIG. 10, the temperature T2 of the heat medium flowing out of the first PCU 112 temporarily increases from a timing corresponding to the time t0. As the flow rate of the heat medium decreases, the heat medium can collect more heat from the first PCU 112. Therefore, the maximum value of the temperature of the heat medium increases (that is, graph F1>graph F2) as the flow rate of the heat medium decreases. As shown in graph C of FIG. 10, the temperature T3 of the heat medium flowing into the second PCU 114 temporarily increases with a delay for a delay period DT1 or DT2 depending on the flow rate of the heat medium. For example, as shown in FIG. 6, the delay period DT1 is 30 seconds when the flow rate of the heat medium is 2 L/min, and the delay period DT2 is 15 seconds when the flow rate of the heat medium is 4 L/min.

In view of the above, in Step S8, the predetermined number of pieces of data to be stored by the cooling control device 20 in Step S12 is set to the number of pieces of temperature data to be estimated in Step S10 within an immediately preceding predetermined period PT1 or PT2. The predetermined periods PT1 and PT2 are set based on the delay periods DT1 and DT2 that are based on the flow rates of the heat medium. For example, when the flow rate of the heat medium is 2 L/min, the predetermined period PT1 is set to the delay period DT1 (that is, 30 seconds) corresponding to the flow rate of the heat medium. In this case, the number of pieces of temperature data of the heat medium to be estimated every 0.1 seconds in Step S10 is 300. Therefore, the predetermined number of pieces of data to be stored as the data group is set to 300 in Step S8 (see FIG. 11). Similarly, when the flow rate of the heat medium is 4 L/min, the predetermined period PT2 is set to the corresponding delay period DT2 (that is, 15 seconds), and the predetermined number of pieces of data to be stored as the data group is set to 150 in Step S8 (see FIG. 11). In this regard, the cooling control device 20 of the present embodiment can reduce the memory capacity required to store the data group including the predetermined number of pieces of data.

The process from Step S10 onward in the third embodiment is the same as the process from Step S10 onward in the first embodiment.

Through the above process, the cooling control device 20 of the present embodiment can also estimate the temperature T3 of the heat medium flowing into the second PCU 114 based on the temperature T2 of the heat medium flowing out of the first PCU 112 in consideration of the delay period DT1 or DT2 between the outflow of the heat medium from the first PCU 112 and the inflow of the heat medium to the second PCU 114. For example, it is assumed, as shown in graph A of FIG. 12, that the torque target value TT of the first PCU 112 is set to the maximum value from a time t0 to a time t1. In this case, as shown in graph B of FIG. 12, the temperature T2 of the heat medium flowing out of the first PCU 112 temporarily increases from a timing corresponding to the time t0, and takes the maximum value at the time t1. Then, the temperature T3 of the heat medium flowing into the second PCU 114 is estimated based on the maximum value. As shown in graph C of FIG. 12, the estimated value T3' of the temperature T3 increases from the time t0 to the time t1, and is kept at the maximum value of the temperature T2 at the time t1 (or a value based on the maximum value) until a time delayed by the predetermined period PT1 or PT2 from the time t1. The predetermined periods PT1 and PT2 are set based on the delay periods DT1 and DT2 that are based on the respective flow rates of the heat medium. As a result, it is possible to avoid the occurrence of the case where the temperature T3 of the heat medium actually flowing into the second PCU 114 exceeds the estimated value T3' obtained by the cooling control device 20.

The cooling control device 20 of the third embodiment can change the predetermined number of pieces of data to be stored as the data group based on the flow rate of the heat medium. According to this configuration, the delay period DT1 or DT2 between the outflow from the first PCU 112 and the inflow to the second PCU 114 is shortened, for example, when the flow rate of the heat medium is relatively high, thereby reducing the predetermined number of pieces of data constituting the data group. Thus, it is possible to reduce the memory capacity required for the cooling control device 20.

Fourth Embodiment

Figure 13:
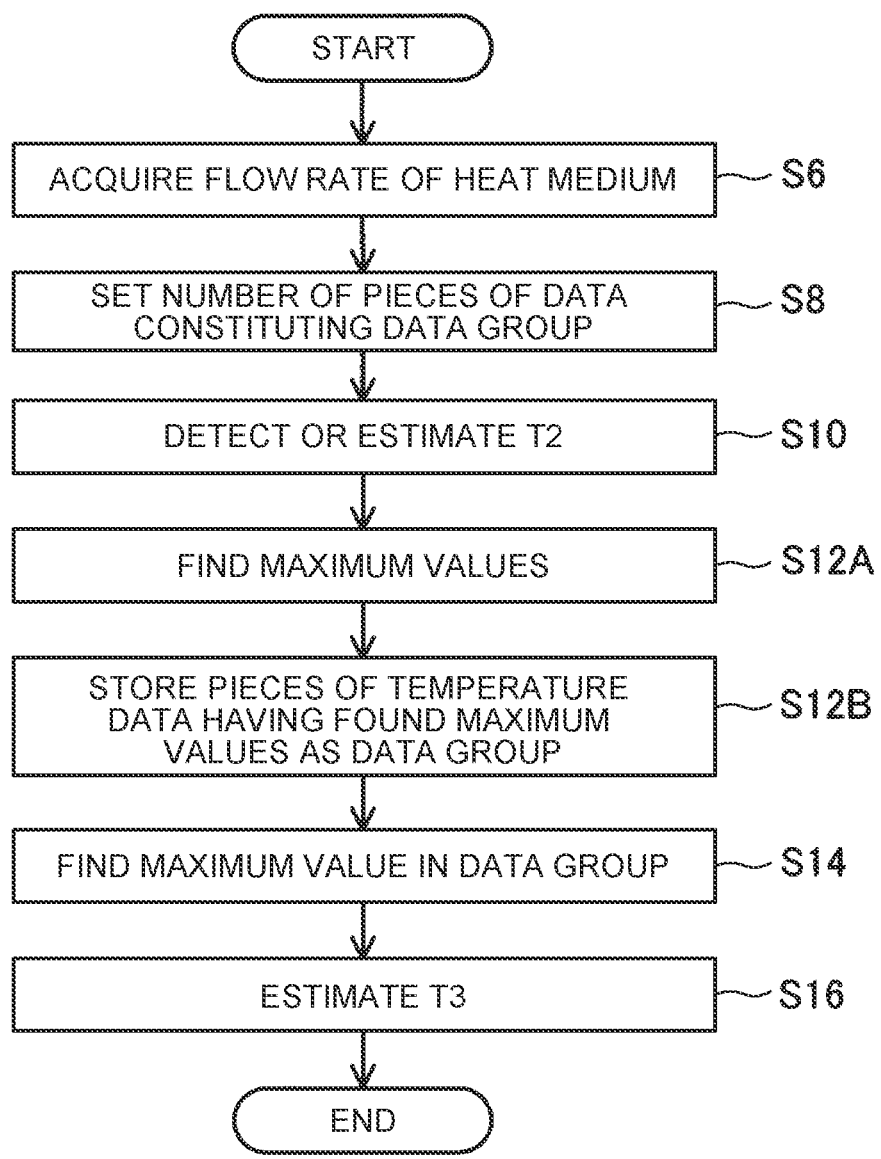
FIG. 13 is a flowchart showing an example of a temperature estimation process to be executed by the cooling control device 20 according to a fourth embodiment.

A cooling system according to a fourth embodiment will be described with reference to FIG. 13. The cooling system of the present embodiment differs from the cooling systems of the first to third embodiments in terms of the temperature estimation process to be executed by the cooling control device 20. Specifically, the cooling control device 20 of the present embodiment executes a temperature estimation process shown in FIG. 13. In this temperature estimation process, the process of Steps S6 and S8 described in the third embodiment is added to the temperature estimation process of the second embodiment shown in FIG. 7. That is, the cooling control device 20 of the present embodiment corresponds to the cooling control device 20 of the second embodiment modified such that the predetermined number of pieces of data to be stored as the data group is changed based on the flow rate of the heat medium.

As understood from the description above, the cooling control device 20 of the present embodiment can also estimate the temperature T3 of the heat medium flowing into the second PCU 114 based on the temperature T2 of the heat medium flowing out of the first PCU 112 in consideration of the delay period between the outflow of the heat medium from the first PCU 112 and the inflow of the heat medium to the second PCU 114.

The two cooling targets of the cooling system 10 of each of the first to fourth embodiments need not essentially be the first PCU 112 and the second PCU 114. In another embodiment, the cooling system 10 may cool either one of the PCUs 112 and 114 and another heat source (for example, an engine). In still another embodiment, two other heat sources may be cooled.

While some specific examples are described in detail above, these are merely illustrative and are not intended to limit the scope of the claims. The technology defined in the claims includes various modifications and alterations of the specific examples described above. The technical elements described herein or in the drawings exhibit their technical usefulness alone or in combination.

What is claimed is:

1. A control device for a cooling system, the cooling system including a cooling path through which a heat medium flows through a first unit into a second unit, the cooling system being configured to cool the first unit and the second unit, the control device comprising a processor, wherein the processor is configured to execute:

a first process of detecting or estimating a temperature of the heat medium flowing out of the first unit at predetermined time intervals;

a second process of storing a plurality of pieces of temperature data of the temperature detected or estimated during a predetermined period as a data group including a predetermined number of pieces of data; and a third process of defining an estimated temperature of the heat medium flowing into the second unit to be equal to a maximum value from the data group, and the processor is configured to change the predetermined number of pieces of data to be stored as the data group depending on a flow rate of the heat medium.

2. The control device according to claim 1, wherein the processor is configured to, when a number of the plurality of pieces of temperature data in the data group reaches the predetermined number of pieces of data in the second process, delete oldest temperature data from the data group and store latest temperature data.

3. The control device according to claim 1, wherein the processor is configured to, in the second process, find a plurality of values respectively in every predetermined unit period for the temperature detected or estimated at the predetermined time intervals, and store the plurality of maximum values as temperature data constituting a second data group.

4. The control device according to claim 3, wherein the processor is configured to change the predetermined unit period depending on the flow rate of the heat medium.

* * * * *